Aug. 17, 1965   O. S. MEIXELL   3,201,678
ELECTRICAL BRIDGE NETWORKS AND CIRCUITS
INCLUDING SAID NETWORKS
Filed Jan. 3, 1961
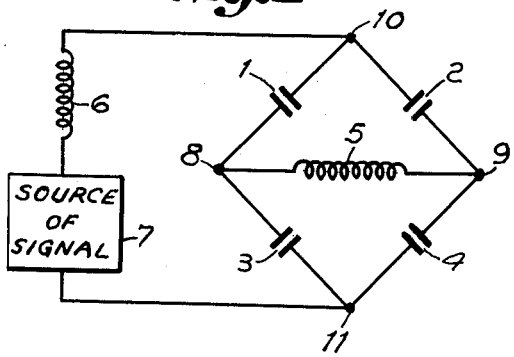
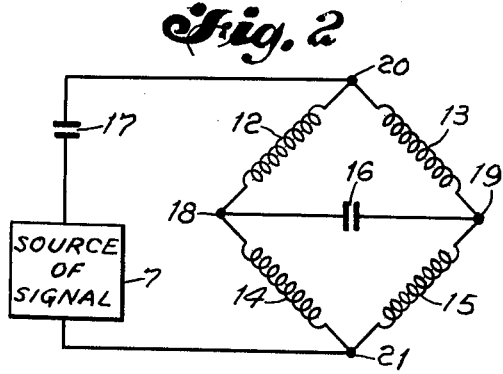
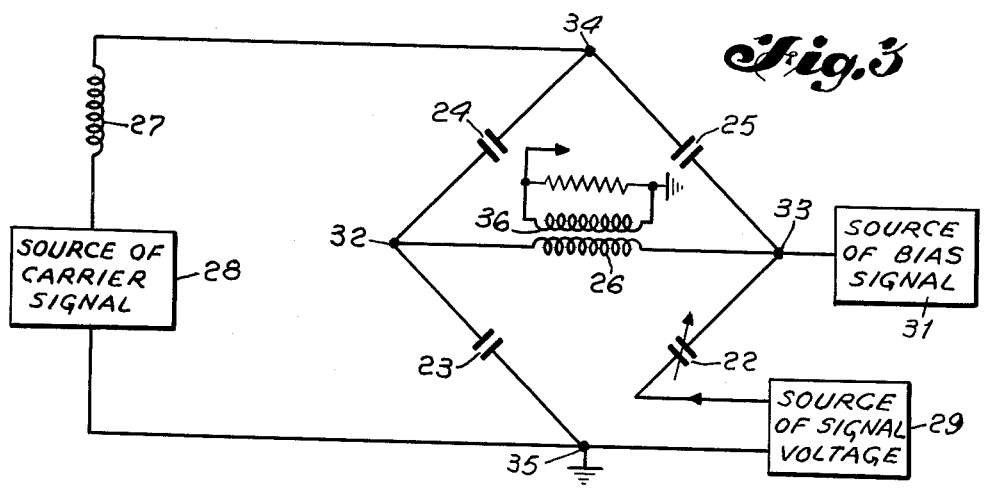
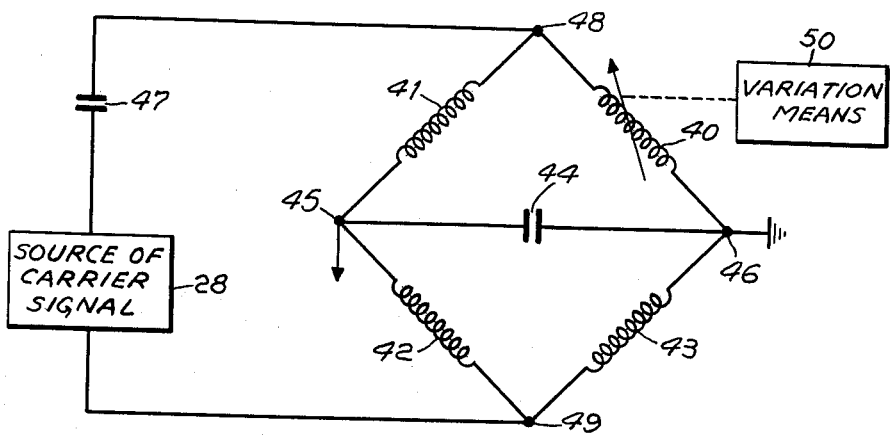
INVENTOR.
OLIVER S. MEIXELL
BY
ATTORNEY

United States Patent Office 3,201,678
Patented Aug. 17, 1965

3,201,678
ELECTRICAL BRIDGE NETWORKS AND CIRCUITS INCLUDING SAID NETWORKS
Oliver S. Meixell, Caldwell, N.J., assignor to International Telephone and Telegraph Corporation, Nutley, N.J., a corporation of Maryland
Filed Jan. 3, 1961, Ser. No. 80,437
11 Claims. (Cl. 321—69)

The present invention relates to electrical bridge circuits, and more particularly to a highly voltage sensitive reactance-bridge network.

In the past, many impedance-bridge configurations have been devised, usually for the express purpose of measuring inductors, capacitors, and their effective resistance components. Such measurements are usually performed at power, audio, carrier, or radio frequencies. Almost invariably, these bridge circuits have one or more of the four bridge-network arms in the form of resistances. This results in inherently low voltage sensitivity, which is of no particular adverse consequence in impedance-bridge measuring applications. In fact, in many instances, conventional bridge structures are designed to operate over wide bands of frequencies, and the use of wholly reactive bridge-network arms would defeat the intended purposes. If, however, a highly voltage sensitive bridge arrangement were available, it would be possible to utilize such circuits to detect and evaluate capacitance and inductance changes, and also as more efficient modulators, discriminators, frequency multipliers, and for other diverse functions.

An object of the present invention is to provide an improved electrical bridge circuit having relatively high voltage sensitivity, and adaptable for use in a wide range of applications.

The present invention provides a bridge network wherein each of the four bridge arms includes a relatively high-Q reactance element of the same sign (either inductive or capacitive) and wherein conjugate reactance elements are provided in both the generator and detector arms.

The present invention is explained with reference to the drawings in which:

FIG. 1 is a schematic diagram of one embodiment of a bridge circuit following the principles of the present invention;

FIG. 2 is a schematic diagram of another (or inverse) embodiment of a bridge circuit following the principles of the present invention;

FIG. 3 is a schematic diagram of the present invention functioning as a modulator; and FIG. 4 is a schematic diagram of another embodiment of the present invention functioning as a modulator.

Referring to FIG. 1, a bridge circuit is shown, having four bridge arms each containing equal-valued capacitors 1, 2, 3, and 4 having negligible dissipation, i.e., extremely high Q values. A first inductance coil 5 is coupled in the detector arm of the bridge network between junctions 8 and 9, and a second inductance coil 6 is coupled in series, between input junctions 10 and 11, with a source 7 of alternating signal $E_c$ at a frequency $f_0$.

The capacitance of the four capacitors 1, 2, 3, and 4 and the inductance of coils 5 and 6 are selected to provide a resonant circuit condition at frequency $f_0$. With capacitors 1, 2, 3, and 4 having equal values, the bridge network will be balanced, and the potential across junctions 8 and 9 ($E_{8,9}$) is zero. If the capacitance (C) of any one capacitor (e.g. capacitor 4) were varied by a small amount $\Delta C$, the bridge network would become unbalanced by a factor $$\epsilon = \frac{\Delta C}{C}$$

The effect of the bridge-network unbalance requires an analytical investigation of the bridge circuit of FIG. 1. It is well known that the expression for the unbalance current through the center or detector arm of any bridge circuit, which also applies to that shown in FIG. 1, is as follows:

$$I_{8,9} = \frac{(Z_1 Z_4 - Z_2 Z_3)E}{Z_5 Z_6(Z_1+Z_2+Z_3+Z_4)+Z_5(Z_1+Z_3)(Z_2+Z_4)+Z_6(Z_1+Z_2)(Z_3+Z_4)+[Z_1 Z_3(Z_2+Z_4)+Z_2 Z_4(Z_1+Z_3)]} \quad (1)$$

which in terms of FIG. 1:

$$Z_5 = Z_6 = jx = j\omega_0 L$$

$$Z_1 = Z_2 = Z_3 = -jx = -j\frac{1}{\omega_0 C}$$

$$Z_4 = -jKx = -j\frac{K}{\omega_0 C}$$

$$K = 1+\epsilon = \frac{\Delta C}{1+C}$$

$$C = \frac{1}{\omega_0^{-2} L}$$

substituting these terms in Equation 1:

$$I_{8,9} = \frac{K-1}{\frac{(jx)^2}{-jx}(3+K)+(-jx)(1+3K)+4(jx)(1+K)} \cdot E \quad (2)$$

but since $$K = 1+\epsilon \text{ and } E_{8,9} = I_{8,9}(jx)$$

$$E_{8,9} = \frac{\epsilon}{\left(\frac{jx}{-jx}\right)(4+\epsilon)+\left(\frac{-jx}{jx}\right)(4+3\epsilon)+4(2+\epsilon)} \cdot E \quad (3)$$

It is to be noted, however, that inductance coils 5 and 6 necessarily have an inherent resistance (R) which changes the expression $jx/-jx$ to be actually expressed—

$$\frac{R+jx}{-jx} = -1+j\frac{R}{x} = -1+j\frac{1}{Q} \quad (4)$$

and $-jx/jx$ would be replaced by the reciprocal of Expression 4:

$$-jx/jx = -1+\frac{1}{Q^2}-\frac{j}{Q} \quad (5)$$

Since the inherent resistance of the coils can be extremely small, preferably approximately 1/100 of the reactance or less, the value of Q will be relatively high and would approach infinity as R approaches zero. Substituting Equation 4 in Equation 3:

$$E_{8,9} = \frac{\epsilon}{\left(-1+j\frac{1}{Q}\right)(4+\epsilon)+\left(-1+\frac{1}{Q^2}-\frac{j}{Q}\right)(4+3\epsilon)+4(2+\epsilon)} \cdot E \quad (6)$$

which becomes:

$$E_{8,9} = \frac{\epsilon}{\frac{4}{Q^2}-j\frac{2\epsilon}{Q}+3\frac{\epsilon}{Q^2}} \cdot E \quad (7)$$

and neglecting $$\frac{3\epsilon}{Q^2}$$

relative to $$\frac{4}{Q^2}$$

$$E_{8,9} = \frac{\epsilon}{\frac{4}{Q^2} - j\frac{2\epsilon}{Q}} \cdot E \quad (8)$$

which can be expressed as:

$$E_{8,9} = \frac{Q^2 \epsilon}{4} \cdot E \frac{1}{1 - j\frac{Q\epsilon}{2}} \quad (9)$$

or $$|E_{8,9}| = \frac{Q^2 \epsilon}{4} \cdot E \frac{1}{\sqrt{1 + \left(\frac{Q\epsilon}{2}\right)^2}} \quad (10)$$

and for small values of $\epsilon$ $$|E_{8,9}| = \frac{Q^2 \epsilon}{4} \cdot E \quad (11)$$

It is to be noted that the voltage sensitivity of the bridge circuit, due to the exclusive use of conjugate reactances, becomes a function of the square of the Q value of the coils. Since high-quality coils are presently available, with practical Q values as high as 200, or more, the above-described bridge circuit exhibits voltage sensitivities heretofore unobtainable with existing bridge circuits employing one or more resistances in the bridge-network arms. For example, a one-percent unbalance ($\epsilon = .01$) in the above-described bridge circuit having coils with a Q value of 100 will produce an unbalance voltage approximately 25 times the value of the impressed voltage. This is of the order of 10,000 (or more) times higher than obtained by conventional impedance-bridge circuits.

Referring to FIG. 2, a bridge circuit is shown, in accordance with the present invention, having inductance coils 12, 13, 14, and 15 connected to form a bridge network with a capacitor 16 connected in the detector arm between junctions 18 and 19 and a second capacitor 17 connected in series between junction 20 and a source 7 of alternating signal $E_c$ at a frequency $f_0$. Like FIG. 1, in the bridge circuit of FIG. 2 the capacitance is the matched conjugate of the inductance and is designed to be resonant at $f_0$. Expression 11 holds true for the circuit of FIG. 2 as well as for the circuit of FIG. 1, representing the unbalance voltage between junctions 18 and 19.

Many practical applications of the present invention will exploit the high voltage sensitivity that is available. Referring to FIG. 3, an illustration of the present invention is shown employed as a modulator. The modulation is parametric in the sense that variations in capacitance are converted into carrier sidebands with but little expenditure of signal energy. A voltage-variable capacitor 22, such as a "Varicap" or other parametric diode, is coupled in a capacitive bridge arrangement with capacitors 23, 24, and 25. The capacitance of variable capacitor 22 will be referred to as $C_v$ and its quiescent value as $C_{vo}$. Fixed capacitances 23, 24 and 25 have values of $C_{vo}$. The total circuit capacitance then being determined, inductance coils 26 and 27 are selected to provide a circuit inductance which will render the circuit resonant at frequency $f_0$, the frequency of the alternating carrier signal $E_c$ from source 28.

Source 29 of signal voltage $E_s$, preferably having little or negligible internal impedance, is coupled to capacitor 22. The capacitance of voltage-variable capacitor 22 will vary in accordance with variations in signal voltage $E_s$ from source 29. In order to maintain capacitor 22 in a range most suitable for low-loss and linear operation, a source 31 of bias voltage $E_b$ is coupled to capacitor 22. Thus, the fractional change of capacitance ($\Delta C/C_{vo}$) caused by a sinusoidal signal voltage $E_s \sin \omega_s t$ will also be sinusoidal.

From Equation 11, the output voltage between junctions 32 and 33 is: $E_{32,33} = A \epsilon E_c$ (12)

where: $A$ is the amplitude coefficient $$\frac{Q^2}{4}$$

$\epsilon = \Delta C / C$
$E_c$ = carrier voltage from source 28
however:

$$\epsilon = \epsilon_0 + \epsilon_v \quad (13)$$

and $$\epsilon_{max} = \epsilon_0 + \epsilon_{vmax} \quad (14)$$

where:
$\epsilon_0$ = initial fixed unbalance
$\epsilon_v$ = unbalance caused by $E_s$
therefore:

$$E_{32,33max} = A(\epsilon_0 + \epsilon_{vmax})(E_{cmax}) \quad (15)$$

On an instantaneous basis and for sinusoidal $\epsilon_v$ and $E_c$:

$$e_{32,33} = A(\epsilon_0 + \epsilon_{vmax} \sin \omega_s t)(e_{cmax} \sin \omega_0 t) \quad (16)$$

or:

$$e_{32,33} = AE_{cmax}\epsilon_0 \sin \omega_0 t + \frac{A\epsilon_{vmax}E_{cmax}}{2} \cos(\omega_0 t - \omega_s t) - \frac{A\epsilon_{vmax}E_{cmax}}{2} \cos(\omega_0 t + \omega_s t) \quad (17)$$

wherein the first expression is the carrier, the second expression is the lower sideband, and the third expression is the upper sideband. From expression 17, it follows that the modulation index $m$ equals $\epsilon_{max/\epsilon_0}$.

It is seen that if there is no initial bridge network unbalance, that is $\epsilon_0 = 0$, the first expression in Equation 17 does not appear and the modulation is of the suppressed-carrier type.

When there is an unbalance voltage of such magnitude that $\epsilon_0 > \epsilon_{vmax}$ there is amplitude modulation and $m = \epsilon_{vmax}/\epsilon_0$. If $\epsilon_{vmax}$ is equal to $\epsilon_0$, there is 100% modulation and $m = 1$.

If there is no initial unbalance ($\epsilon_0 = 0$) and the frequency of source 28 is made equal to the frequency of source 29, that is, $\omega_0 = \omega_s$, then Equation 17 is written:

$$e_{32,33} = \frac{AE_{vmax}E_{cmax}}{2} \cos(2\omega_0 t) \quad (18)$$

and the circuit of FIG. 3 can be used as a frequency doubler. Likewise, when $\epsilon_0 = 0$ and $f_c \pm f_s = f_0$ the circuit can be used for frequency conversion.

It is to be noted that, in Equation 17, each expression is a multiple of $$A = \frac{Q^2}{4}$$

which means that, in each of the above-discussed applications, a high degree of voltage sensitivity and amplification is obtained by the conjugate-reactance feature of the present invention.

The output signal from the bridge circuit is obtained from inductor 26 by means of secondary coil 36. The coupling from coil 26 to coil 36 should be selected so as to modify the initial inductance of coil 26 as little as possible from its unloaded value so the conjugate match will still be maintained.

The circuit illustrated in FIG. 3 may be employed as a modulator, a frequency doubler, or a frequency converter for use with frequencies up to 300 mc. Since it is known that open-end and shorted sections of waveguides and coaxial lines of appropriate length produce inductive and capacitive effects, it is apparent that high-frequency or microwave versions of the present invention would be possible by utilizing the waveguide and coaxial-line sections for the capacitive and inductive elements illustrated in FIGS. 1, 2 and 3.

Referring to FIG. 4, an inverse version of the circuit of FIG. 3 is shown, following the principles of the present invention. A variable inductance coil 40 is coupled in bridge arrangement with fixed inductance coils 41, 42, and 43. Variable inductance coil 40 has a quiescent value $L_{vo}$, and fixed inductance coils should have values of $L_{vo}$. A first capacitor 44 is coupled in the bridge detector arm between junctions 45 and 46, and a second capacitor 47 is coupled in series with a source of alternating carrier signal 28 between junctions 48 and 49. Source of alternating carrier signal 28 is similar to that shown in FIG. 3, being a balanced-output generator providing a carrier signal $E_c$ at a frequency $f_o$. The values of capacitors 44 and 47 are selected to provide circuit resonance at frequency $f_o$.

A variation means 50 is coupled to variable inductance coil 40 to provide variations in inductance. Variable inductance coil 40 may be mechanically variable, and source 50 may be then mechanically coupled thereto, or coil 40 may be voltage variable, and source 50 may be an inductance-varying reactance tube with a variable signal coupled thereto. Variations in inductance of coil 40 provide modulations of the signal of source 28 in a manner described in FIG. 3, with the modulated signal from source 28 appearing as an output signal at junction 45. In like manner, the circuit of FIG. 4 may also function as a frequency doubler and frequency converter according to the analysis set forth for the circuit of FIG. 3.

From the discussion hereinabove, it is seen that a highly voltage sensitive bridge has been developed based on the use of conjugate reactances resonant at a given operating frequency. The invention may be employed for modulation, frequency doubling, frequency conversion and other related uses where a highly sensitive network is required. It can also be used to detect and evaluate capacitance and inductance changes irrespective of whether these changes are effected by electrical or mechanical means.

While I have described the principles of my invention in connection with specific apparatus, it is to be clearly understood that this description is made only by way of example and not as a limitation to the scope of my invention as set forth in the objects thereof and in the accompanying claims.

I claim:

1. A bridge circuit comprising:
   a bridge network having a given voltage sensitivity consisting of
      a first terminal,
      a second terminal,
      a first circuit connected between said first and second terminals consisting of first and second reactance means connected in series relationship with respect to each other, each of said first and second reactance means having a given sign and a given reactance magnitude at a predetermined frequency, and
      a second circuit connected between said first and second terminals consisting of third and fourth reactance means connected in series relationship with respect to each other, each of said third and fourth reactance means having said given sign and said given reactance magnitude at said predetermined frequency; and
   means to substantially increase said given sensitivity of said bridge network consisting of
      a third circuit connected between the junction of said first and second reactance means and the junction of said third and fourth reactance means consisting of a first conjugate reactance means having a sign opposite to said given sign and a reactance magnitude equal to said given reactance magnitude at said predetermined frequency, and
      a fourth circuit connected between said first and second terminals consisting of a source of signals and a second conjugate reactance means connected in series relationship with respect to each other, the signal of said source of signal having a frequency equal to said predetermined frequency, and said second conjugate reactance means having a sign opposite to said given sign and a reactance magnitude equal to said given reactance magnitude at said predetermined frequency.

2. A bridge circuit according to claim 1, wherein said first, second, third, and fourth reactance means each consist of a capacitor and said first and second conjugate reactance means each consist of an inductor.

3. A bridge circuit according to claim 2, wherein at least one of said capacitors is a variable capacitor.

4. A bridge circuit according to claim 1, wherein said first, second, third, and fourth reactance means each consist of an inductor and said first and second conjugate reactance means each consist of a capacitor.

5. A bridge circuit according to claim 4, wherein at least one of said inductors is a variable inductor.

6. A bridge modulator circuit comprising:
   a bridge network having a given voltage sensitivity consisting of
      a first terminal;
      a second terminal,
      a first circuit connected between said first and second terminals consisting of first and second fixed reactance means connected in series relationship with respect to each other, each of said first and second reactance means having a given sign and a given reactance magnitude at a predetermined frequency, and
      a second circuit connected between said first and second terminals consisting of a third fixed reactance means and a variable reactance means connected in series relationship with respect to each other, each of said third fixed reactance means and said variable reactance means having a sign equal to said given sign, and the reactance magnitude of said third fixed reactance means and the quiescent reactance magnitude of said variable reactance means each being equal to said given reactance magnitude at said predetermined frequency;
   means to substantially increase said given sensitivity of said bridge network consisting of
      a third circuit connected between the junction of said first and second fixed reactance means and the junction of said third fixed reactance means and said variable reactance means consisting of a first conjugate reactance means having a sign opposite said given sign and a reactance magnitude equal to said given reactance magnitude at said predetermined frequency, and
      a fourth circuit connected between said first and second terminals consisting of a source of carrier signals and a second conjugate reactance means connected in series relationship with respect to each other, said carrier signal having a frequency equal to said predetermined frequency, and said second conjugate reactance means having a sign opposite said given sign and a reactance magnitude equal to said given reactance magnitude at said predetermined frequency;
   means coupled to said first conjugate reactance means to derive an output signal therefrom; and
   means coupled to said variable reactance means to vary the reactance thereof to modulate said carrier signal, said resultant modulated signal being said output signal.

7. A bridge modulator circuit according to claim 6, wherein said first, second, and third fixed reactance means and said variable reactance means each consist of a capacitor and said first and second conjugate reactance means each consist of an inductor.

8. A bridge modulator circuit according to claim 6, wherein said first, second, and third fixed reactance means and said variable reactance means each consist of an inductor and said first and second conjugate reactance means each consist of a capacitor.

9. A bridge modulator circuit comprising:
a bridge network having a given voltage sensitivity consisting of
    a first terminal,
    a second terminal,
    a third terminal,
    a fourth terminal,
    a first fixed capacitor connected directly between said first and second terminals having a given reactance magnitude at a predetermined frequency,
    a second fixed capacitor connected directly between said second and third terminals having a reactance magnitude equal to said given reactance magnitude at said predetermined frequency,
    a third fixed capacitor connected directly between said first and fourth terminals having a reactance magnitude equal to said given reactance magnitude at said predetermined frequency, and
    a first circuit connected directly between said third and fourth terminal consisting of a voltage variable capacitor and a source of signal voltage connected in series relationship with respect to each other, the quiescent reactance magnitude of said variable capacitor being equal to said given reactance magnitude at said predetermined frequency;
means to substantially increase said given sensitivity of said bridge network consisting of
    a first inductor connected directly between said second and fourth terminals having a reactance magnitude equal to said given reactance magnitude at said predetermined frequency, and
    a second circuit connected directly between said first and third terminals consisting of a source of carrier signal and a second inductor connected in series relationship with respect to each other, said carrier signal having a frequency equal to said predetermined frequency, and said second inductor having a reactance magnitude equal to said given reactance magnitude at said predetermined frequency; and
an output circuit electromagnetically coupled to said first inductor to derive an output signal therefrom produced by the modulation of said carrier signal by said signal voltage, said modulation of said carrier signal being accomplished by said signal voltage varying the capacitance of said variable capacitor.

10. A frequency-doubling bridge circuit comprising:
a bridge network having a given voltage sensitivity consisting of
    a first terminal,
    a second terminal,
    a third terminal,
    a fourth terminal,
    a first fixed capacitor connected directly between said first and second terminals having a given reactance magnitude at a predetermined frequency,
    a second fixed capacitor connected directly between said second and third terminals having a reactance magnitude equal to said given reactance magnitude at said predetermined frequency,
    a third fixed capacitor connected directly between said first and fourth terminals having a reactance magnitude equal to said given reactance magnitude at said predetermined frequency, and
    a first circuit connected directly between said third and fourth terminals consisting of a voltage variable capacitor and a source of signal voltage connected in series relationship with respect to each other, the quiescent reactance magnitude of said variable capacitor being equal to said given reactance magnitude at said predetermined frequency, and said signal voltage having a frequency equal to said predetermined frequency;
means to substantially increase said given sensitivity of said bridge network consisting of
    a first inductor connected directly between said second and fourth terminals having a reactance magnitude equal to said given reactance magnitude at said predetermined frequency, and
    a second circut connected directly between said first and third terminals consisting of a source of carrier signal and a second inductor connected in series relationship with respect to each other, said carrier signal having a frequency equal to said predetermined frequency, and said second inductor having a reactance magnitude equal to said given reactance magnitude at said predetermined frequency; and
an output circuit electromagnetically coupled to said first inductor to derive an output signal therefrom having a frequency two times said predetermined frequency, said output signal being produced by said signal voltage varying the capacitance of said variable capacitor.

11. A frequency-converter bridge circuit comprising:
a bridge network having a given voltage sensitivity consisting of
    a first terminal,
    a second terminal,
    a third terminal,
    a fourth terminal,
    a first fixed capacitor connected directly between said first and second terminals having a given reactance magnitude at a predetermined frequency,
    a second fixed capacitor connected directly between said second and third terminals having a reactance magnitude equal to said given reactance magnitude at said predetermined frequency,
    a third fixed capacitor connected directly between said first and fourth terminals having a reactance magnitude equal to said given reactance magnitude at said predetermined frequency, and
    a first circuit connected directly between said third and fourth terminals consisting of a voltage variable capacitor and a source of signal voltage connected in series relationship with respect to each other, the quiescent reactance magnitude of said variable capacitor being equal to said given reactance magnitude at said predetermined frequency, and said signal voltage having a frequency equal to a second frequency;
means to substantially increase said given sensitivity of said bridge network consisting of
    a first inductor connected directly between said second and fourth terminals having a reactance magnitude equal to said given reactance magnitude at said predetermined frequency, and
    a second circuit connected directly between said first and third terminals consisting of a source of carrier signal and a second inductor connected in series relationship with respect to each other, said carrier signal having a frequency equal to said predetermined frequency, and said second inductor having a reactance magnitude equal to said given reactance magnitude at said predetermined frequency; and an output circuit electromagnetically coupled to said first inductor to derive an output signal therefrom having a frequency different than said predetermined frequency and said second frequency, said output signal being produced by said signal voltage varying the capacitance of said variable capacitor.

References Cited by the Examiner

UNITED STATES PATENTS

| | | | |
|---|---|---|---|
| 1,745,378 | 2/30 | Osnos | 323—43 |
| 2,418,641 | 4/47 | Huge | 321—68 |
| 2,565,799 | 8/51 | Brattain | 323—75 |
| 2,632,883 | 3/53 | Richardson | 323—75 |
| 2,696,530 | 12/54 | Kerns | 321—69 |
| 2,828,420 | 3/58 | Suozzi | 321—69 |
| 2,995,651 | 8/61 | Bock | 332—47 |

FOREIGN PATENTS 1,005,137  3/57  Germany.

OTHER REFERENCES

"Wide Range Modulator," by L. Laczko; published in IBM Technical Disclosure Bulletin, volume 2, No. 4, December 1959; page 63.

Electrical Manufacturing, December 1954, pages 83–88.

LLOYD McCOLLUM, *Primary Examiner*.

SAMUEL BERNSTEIN, *Examiner*.